United States Patent
Allan et al.

(10) Patent No.: US 8,377,190 B2
(45) Date of Patent: Feb. 19, 2013

(54) METHODS AND ARRANGEMENT FOR CREATING ASPHALT EMULSION

(75) Inventors: Lance Allan, Santa Fe Springs, CA (US); Jim Farnell, Santa Fe Springs, CA (US)

(73) Assignee: Pacific Emulsions, Inc, Santa Fe Springs, CA (US)

( * ) Notice: Subject to any disclaimer, the term of this patent is extended or adjusted under 35 U.S.C. 154(b) by 501 days.

(21) Appl. No.: 12/618,507

(22) Filed: Nov. 13, 2009

(65) Prior Publication Data

US 2011/0113985 A1    May 19, 2011

(51) Int. Cl.
C08L 95/00    (2006.01)
C09D 195/00   (2006.01)
(52) U.S. Cl. .................................................... 106/277
(58) Field of Classification Search ............... 106/277
See application file for complete search history.

(56) References Cited

U.S. PATENT DOCUMENTS 6,840,991 B2 *   1/2005   Honma et al. ......... 106/123.13

OTHER PUBLICATIONS

"Technical Information, Asphalt Applications, REDICOTE E-7000", Akzo Nobel, (Dec. 2001).*
"Technical Information, Asphalt Applications, REDICOTE/e-11", Akzo Nobel (Oct. 2001).*
"Material Safety Data Sheet, REDICOTE E-7000", Akzo Nobel, MSDS# 15-01653, (Apr. 23, 2009).*
"Terminal Blended Tire Rubber Modified Asphalt Cement", Wright Asphalt Products Co. (Spring 2008).*

* cited by examiner

*Primary Examiner* — David M Brunsman
(74) *Attorney, Agent, or Firm* — IPSG, P.C. Intellectual Property Law

(57) ABSTRACT

A method for creating asphalt emulsion is provided. The method includes heating a base asphalt. The method also includes injecting the base asphalt into a colloid mill. The method further includes breaking up the base asphalt into small particles. The method yet also include preparing a soap solution, wherein the soap solution includes an acid, water, and a first emulsifier, wherein the first emulsifier is an alkyl amines salt based emulsifier. The method yet further includes combining the small particles of the base asphalt with the soap solution to create the asphalt emulsion.

17 Claims, 2 Drawing Sheets

METHODS AND ARRANGEMENT FOR CREATING ASPHALT EMULSION

CROSS REFERENCE TO RELATED APPLICATIONS

The present invention is related to a commonly assigned application entitled "Methods and Arrangement for Handling Asphalt Emulsion," filed on even date herewith by Farnell et al., which is incorporated by reference herein.

BACKGROUND OF THE INVENTION

Asphalt has long been employed in modern society for tasks such as road construction and/or repair. Generally speaking, asphalt pavement is comprised of a mixture of petroleum-based bitumen and a filler such as aggregate. The petroleum—based bitumen is obtained, for example, from petroleum processing plants since bitumen is one of the remaining heavy by-products of the petroleum processing process.

At room temperature, asphalt is formulated to remain in its solid state to provide the desirable mechanical characteristics for construction purposes. To facilitate application of asphalt to the work surface, the asphalt is rendered more flowable by either heating or emulsification. In heating, the asphalt mixture that includes the bitumen as well as any optional filler is heated above the mixture's melting point. For example, at above a few hundred degrees (Fahrenheit), the mixture becomes more fluid-like and can be more easily applied.

In emulsifying, the bitumen material is sheared or broken into tiny particles and then mixed with a soap solution and water. The tiny bitumen-based particles are kept in suspension until applied. During the curing process, the soap and water are drawn from the applied mixture, allowing the particles of petroleum-based bitumen to bind to one another or to an aggregate, thereby forming the desired resultant construction asphalt.

To further elaborate on the emulsification process, base asphalt is typically provided from a petroleum processing plant. The base asphalt is first heated up to, for example, 350 degrees and then injected into a colloid mill for mixing with a soap mixture. Inside a colloid mill, the hot base asphalt is sheared or broken up into fine particles of roughly 3-10 microns in size or smaller. The fine particles of the base asphalt are then mixed with a soap solution and water to create an asphalt emulsion. The resultant asphalt emulsion may then be stored for future use or immediately applied to the work surface, either by itself or mixed with some other filler. Other materials such as a set retarder (to control the set time) or one or more compounds to improve certain characteristics of the resultant asphalt may also be added.

In practice, it is often a challenge to reliably create a stable, long-shelf life asphalt emulsion. This is due to a variety of factors. For example, different base asphalt materials (e.g., from different types of crude oil) may react differently to the same emulsification formula and/or soap mixture. In other example, different handling arrangements (e.g., pumps) may cause a particular batch of asphalt emulsion to fail but not another. In other examples, differences in the ambient temperature during storage may affect the resultant asphalt emulsion. In some cases, the asphalt particles may refuse to stay in suspension, resulting in a failed batch. In other cases, the resultant asphalt emulsion may have less than desirable mechanical or temperature-dependent properties, which affect the durability of the work product. In still other cases, the resultant asphalt emulsion may have an undesirably short shelf-life.

Creating an improved asphalt emulsion is one of the goals of the present patent application.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
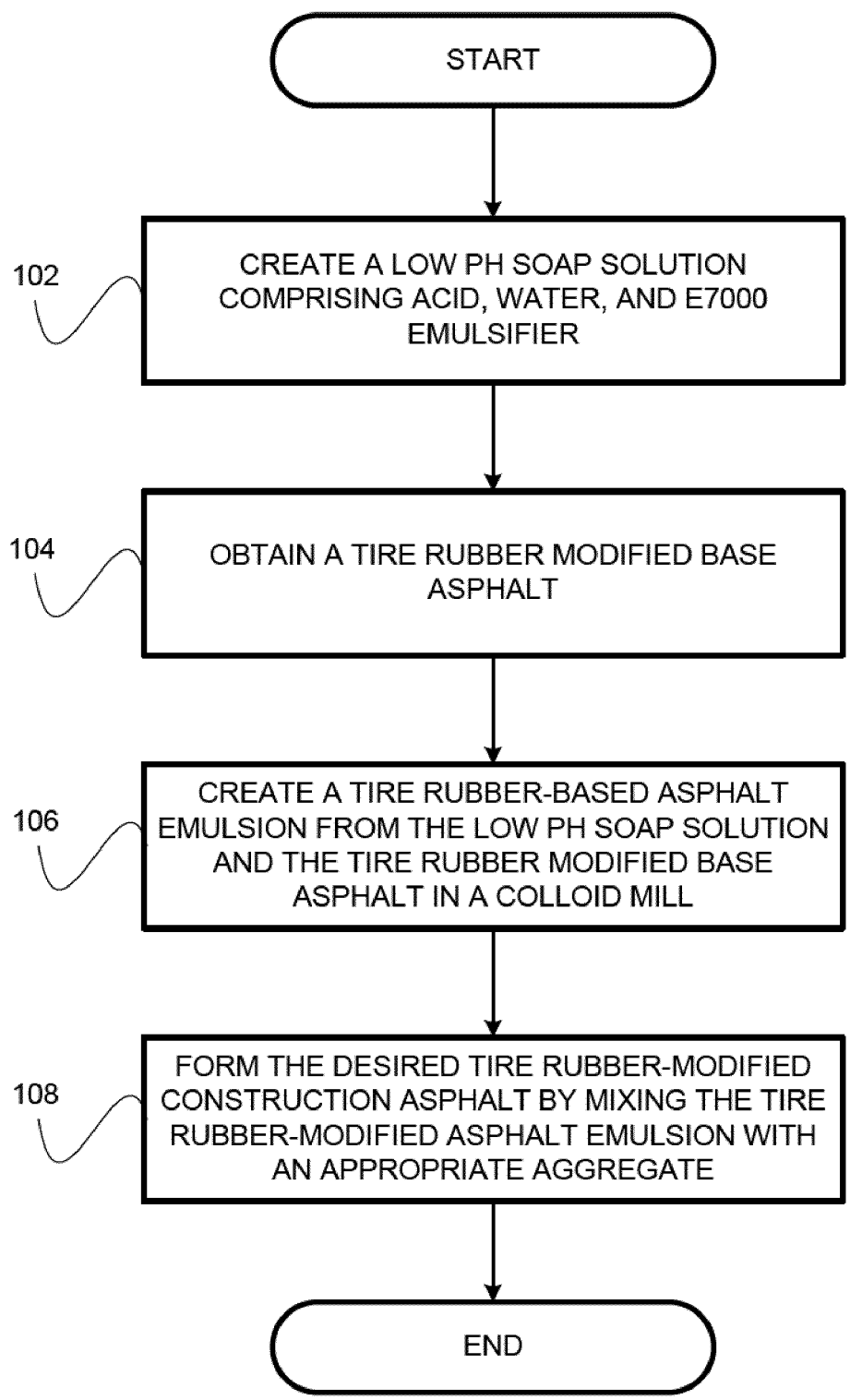
FIG. 1 shows, in accordance with one or more embodiments of the present invention, a method for creating an improved soap solution for use in making tire-rubber-modified asphalt emulsion.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention pertain to improved formulas and/or techniques for creating and/or handling asphalt emulsions. In an embodiment of the invention, an improved soap formula is provided. With the improved soap formula, the resultant asphalt emulsion has an improved shelf-life. Further, emulsification is better controlled, with a wider tolerance window such that successful emulsification is more likely irrespective of the type of base asphalt material employed, the type of handling pump employed, and/or the ambient condition during manufacturing/storage/transportation. Still further, the improved soap solution yields improved and durable final asphalt products, with desirable mechanical and/or temperature-dependent characteristics.

In an embodiment of the invention, an inventive emulsification technique is provided to facilitate the creation of improved asphalt emulsions configured to be used for asphalt pavements. In another embodiment of the invention, an inventive emulsification technique is provided to facilitate the creation of improved tire-rubber-modified asphalt emulsions. Tire-rubber-modified asphalt emulsions refer to asphalt emulsions that employ fine particles of recycled tire rubber in their formulations. In some cases, tire-rubber-modified asphalt emulsions may be preferred by some customers due to some specific mechanical and/or other characteristics and/or due to the desire to purchase products that employ recycled waste materials (such as used tires).

In an embodiment, tiny particles of tire rubber (less than or equal to 425 microns) may be added to the raw base asphalt material prior to being processed in the colloid mill. The particles of tire rubber function, as has been hypothesized by some, may provide certain beneficial synthetic rubber and/or plastic chemicals and may provide some of the benefits typically seen when a material, such as latex, is added to the asphalt emulsion.

In an embodiment of the invention, an improved soap solution comprising acid, water, and an emulsifier is provided to facilitate the creation of cationic (positively charged) asphalt emulsions. Useful emulsifiers include amines, tall oils, quaternary ammonium salt, and alkyl amines salt (e.g. E7000 manufactured by AkzoNobel, which is headquartered in Amsterdam, the Netherlands). In a novel and nonobvious manner, the resultant soap solution has a pH balance of between 0.3 and 1. In some embodiments of the invention, the acid is preferably HCl. It has been discovered by the inventors herein that such low pH soap solutions unexpectedly improve the reliability of the emulsion process for tire-rubber-modified asphalt emulsions, as well as yielding improved asphalt final products.

In other embodiments, other acids such as phosphoric acid may be employed. In some embodiments of the invention, the highly concentrated acid (e.g., above 10 percent acid concentration by weight) may be added directly to the E7000 emulsifier. In an embodiment of the invention, acid diluted in water with a weight concentration of between about 10 percent and about 20 percent, more preferably a weight concentration of between about 13 percent and about 16 percent may be added directly to the E7000 emulsifier. In an example, an HCl acid solution of about 15 percent concentration by weight is added to the E7000 emulsifier such that the resultant soap has about 80 percent to 90 percent of E7000 emulsifier and about 10 percent to 20 percent of the diluted HCl solution.

The features and advantages of the present invention may be better understood with reference to the figures and discussions that follow.

FIG. 1 shows, in accordance with one or more embodiments of the present invention, a method for creating an improved soap solution for use in making tire-rubber-modified construction asphalt.

At a first step 102, a low pH soap solution comprising acid, water, and E7000 emulsifier is created.

At a next step 104, a tire-rubber-modified base asphalt is obtained.

At a next step 106, a tire-rubber-based asphalt emulsion is created from the low pH soap solution and the tire-rubber-modified base asphalt in a colloid mill.

At a next step 108, the tire-rubber-modified asphalt emulsion is mixed with an appropriate aggregate to form the desired tire-rubber-modified asphalt pavement.

In another embodiment of the invention, an addition emulsifier, such as quaternary ammonium salt (e.g., E11 manufactured by AkzoNobel, which is headquartered in Amsterdam, the Netherlands) may be added to the acid/water/E7000 combination to create a soap solution that is well-suited for use with tire-rubber-modified asphalt emulsions as well as with other modified asphalt emulsions. With the addition of E11, a low pH soap solution is not strictly required, but may result in better quality emulsion. For example, up to 4 percent of E11 may be added to an acid/water/E7000 combination to result in a soap solution for use in asphalt emulsion. In a specific example, a HCl acid solution having a concentration by weight of about 20 percent is added to the E7000 emulsifier and E11 emulsifier in the ratio of 60 to 40. In one embodiment, 50 percent of the acid is first added to the E7000. Then 75 percent of the E11 is added to the solution. This is followed by adding the remaining 50 percent of the acid to the solution before adding the remaining 25 percent of the E11 to the solution. By adding the material in this sequence the concentrated soap solution is mixed without gelling. Thus, when the water is added to the concentrated soap solution, the water is able to properly mix with the concentrated soap solution to form the final soap solution. Those skilled in the art are aware that if the concentrated soap solution gels before the water is added to the solution, the water will not be properly mixed since water has a difficult time mixing with a gelled solution.

The resultant soap solution, when introduced into a colloid mill with a base tire-rubber-modified asphalt material, has been found to create improved asphalt emulsifiers with a greater tolerance window for different temperature ranges, different pumping methods and mechanisms during handling and/or transportation, different base asphalt materials, and with improved mechanical and other characteristics.

Figure 2:
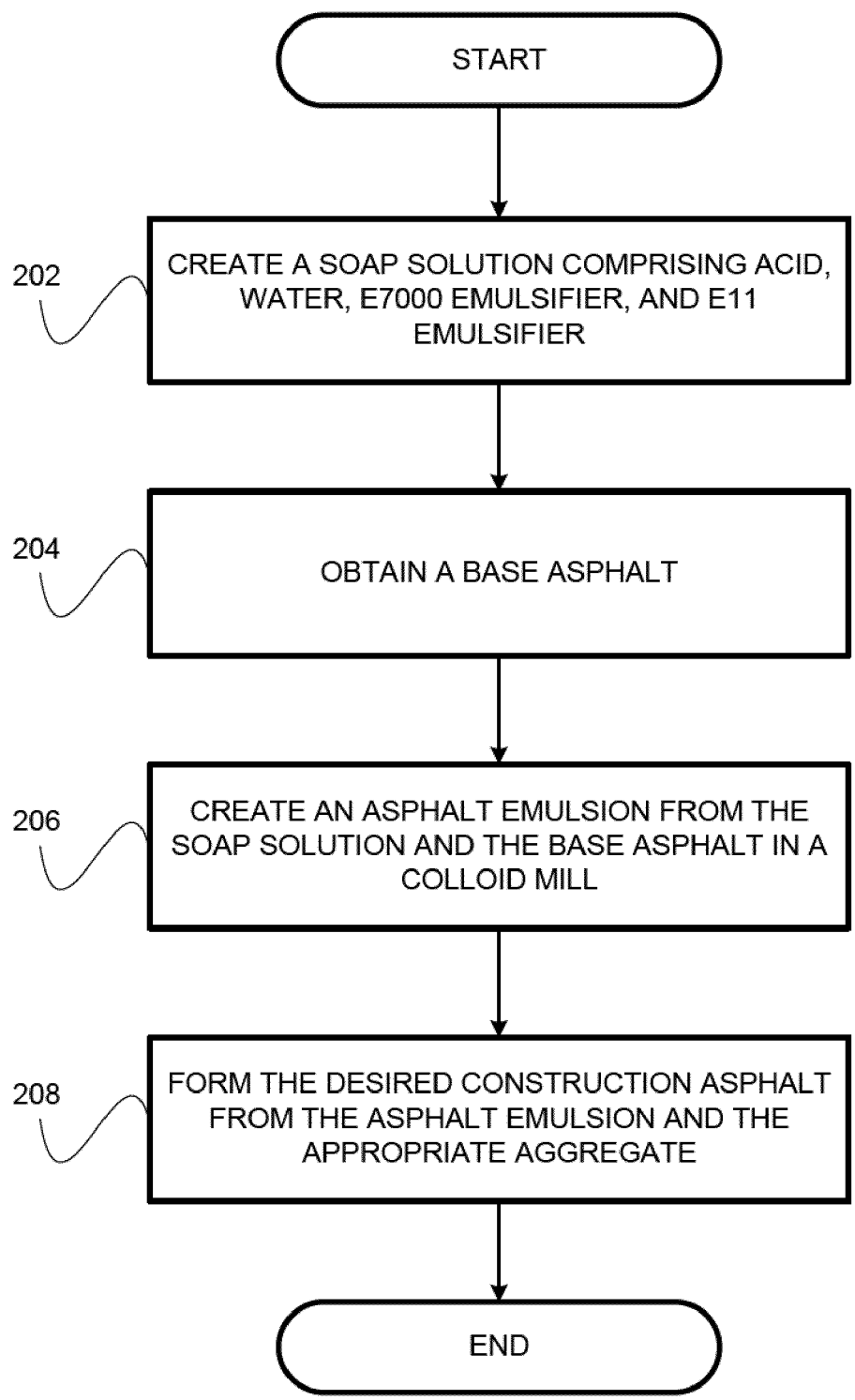
FIG. 2 shows, in accordance with one or more embodiments of the present invention, a method for creating an improved soap solution for use in making asphalt emulsion.

FIG. 2 shows, in accordance with one or more embodiments of the present invention, a method for creating an improved soap solution for use in making construction asphalt.

At a first step 202, a soap solution comprising acid, water, E7000 emulsifier, and E11 emulsifier is created.

At a next step 204, a base asphalt is obtained.

At a next step 206, an asphalt emulsion is created from the soap solution and the base asphalt in a colloid mill.

At a next step 208, asphalt emulsion is mixed with an appropriate aggregate to form the desired asphalt pavement.

As can be seen from the foregoing, embodiments of the invention result in improved asphalt emulsions, particularly tire-rubber-modified asphalt emulsions having unexpected and marked improvements in the tolerance window as well as in shelf-life, mechanical and/or temperature dependent characteristics.

In accordance with embodiments of the invention, there are provided improved pumping arrangements for reducing the risk of asphalt emulsion becoming spoiled due to asphalt particles coalescing out of the suspension. The inventors herein note that when gear transfer pumps are employed, there is a heightened risk of asphalt emulsion becoming spoiled due to asphalt particles coalescing out of the suspension. It is believed by the inventors herein that the spoilage is due to the additional stress, pressure, and shear attributable to the use of gear pumps (also known as positive displacement pumps) in the transfer path between the colloid mill and the job site.

To further elaborate, after the asphalt emulsion is created and exits from the colloid mill, a transfer pump transfers the asphalt emulsion from the colloid mill to one or more storage tanks. When the asphalt emulsion is green (i.e., just exited from the colloid mill) and at an elevated colloid mill temperature (e.g., about 150-210 degree Fahrenheit), the asphalt particles in the suspension are highly susceptible coalescing if handling is not optimal. In some cases, new asphalt emulsion formulas need to be created to reduce the incidence of asphalt emulsion spoilage.

Further, when the asphalt emulsion is ready to be used, the asphalt emulsion is pumped from a storage tank to a transportation truck. Again, a gear pump tends to be employed for the transfer in the prior art. Additionally, another gear pump may be employed to transfer the asphalt emulsion from the transport truck to a temporary job-site storage tank, such as a job-site trailer. Again, a gear pump tends to be employed for the transfer in the prior art. Gear transfer pump (positive displacement pump). At some point, another gear transfer pump may be employed to pump the asphalt emulsion material from the temporary transport tank to an on-site slurry machine for mixing the asphalt emulsion with an appropriate aggregate prior to laying down the slurry that comprises the asphalt emulsion and the aggregate.

It is believed by the inventors herein that multiple pump cycles using gear pumps, with each cycle imparting additional stress, pressure, and shear to the asphalt emulsion, also contributes to a higher incidence of asphalt particles coalescing from the suspension. Altering the asphalt emulsion formulas may help in some cases. However, some asphalt emulsion formulas, particularly those involving tire-rubber-modified asphalt emulsion cannot be significantly altered. In these cases, it is highly desirable to find other techniques for asphalt handling in order to reduce the incidence of asphalt emulsion spoiling.

In accordance with one or more embodiments of the invention, a diaphragm transfer pump is employed instead to transfer the asphalt emulsion, particularly the tire-rubber-modified asphalt emulsion. Upon realizing that the use of gear pumps is a significant factor contributing to asphalt emulsion spoilage, the inventors herein attempted to use other types of pumps to alleviate the spoilage issue instead of attempting to change the asphalt emulsion formulas to satisfy the high stress, high shear requirements of gear pumps. When centrifugal pumps are attempted, it has been discovered that centrifugal pumps tend to create foam, which then causes the centrifugal pump to lose prime or at least efficiency during pumping.

In one or more embodiments of the invention, one or more diaphragm pumps may be employed to transfer the asphalt emulsion, and in an embodiment, the tire-rubber-modified asphalt emulsion from the colloid mill to the storage tank(s).

Additionally or alternatively, in one or more embodiments of the invention, one or more diaphragm pumps may be employed to transfer the asphalt emulsion, and in an embodiment, the tire-rubber-modified asphalt emulsion, from the storage tank(s) to the transportation truck(s).

Additionally or alternatively, in one or more embodiments of the invention, one or more diaphragm pumps may be employed to transfer the asphalt emulsion, and in an embodiment, the tire-rubber-modified asphalt emulsion, from the transportation truck(s) to the job-site temporary storage tank(s), such as job-site trailer(s).

Additionally or alternatively, in one or more embodiments of the invention, one or more diaphragm pumps may be employed to transfer the asphalt emulsion, and in an embodiment, the tire-rubber-modified asphalt emulsion, from the job-site temporary storage tank(s) to the job-site slurry machine(s).

When a diaphragm pump is employed instead of a gear pump, the incidence of asphalt particles coalescing out of the suspension is advantageously reduced. This is particularly important for green asphalt emulsion recently processed in a colloid mill and still having a relatively high temperature. The elimination of the stress, pressure, and shear associated with gear pumps also renders it possible to use certain sensitive asphalt emulsion formulas that were unable to withstand being pumped through multiple pump cycles using gear pumps. Since the diaphragm pumps do not subject the asphalt emulsion to the same stress, pressure, and shear, multiple pumping cycles are possible even when these sensitive asphalt emulsions are involved.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for creating asphalt emulsion, comprising:
heating a base asphalt;
injecting said base asphalt into a colloid mill;
breaking up said base asphalt into small particles;
preparing a soap solution, wherein said soap solution includes an acid solution, water, and a first emulsifier; and
combining said small particles of said base asphalt with said soap solution to create said asphalt emulsion;
wherein said preparing said soap solution includes
providing an alkyl amines salt first emulsifier;
providing a quaternary ammonium salt second emulsifier;
adding a first portion of said acid solution to said first emulsifier to form a first solution;
mixing a first portion of said quaternary ammonium salt second emulsifier to said first solution to form a second solution;
adding the remaining portion of said acid solution to said second solution to form a third solution;
combining the remaining portion of said quaternary ammonium salt second emulsifier to said third solution; and
adding water to said third solution to form said soap solution.

2. The method of claim 1 wherein forming said first solution includes
providing a diluted acid solution wherein said acid solution represents ten to twenty percent of the weight of said soap solution, and
adding said diluted acid solution to said first emulsifier, wherein said first emulsifier represents eighty to ninety percent of said weight of said soap solution.

3. The method of claim 2 wherein said soap solution has a pH balance between about 0.3 and about 1.

4. The method of claim 2 wherein said acid is hydrogen chloride.

5. The method of claim 2 wherein said acid is phosphoric acid.

6. The method of claim 2 wherein said base asphalt is a tire-rubber-modified asphalt, wherein said tire-rubber-modified asphalt includes at least particles of tire rubber and said base asphalt.

7. The method of claim 6 wherein the size of said particles of said tire rubber is less than or equal to about 425 microns.

8. The method of claim 1 wherein the size of said base asphalt is a tire-rubber-modified asphalt, wherein said tire-rubber-modified asphalt includes at least particles of tire rubber and said base asphalt.

9. The method of claim 8 wherein said particles of said tire rubber is less than or equal to about 425 microns.

10. The method of claim 1 wherein the incidence of asphalt particles coalescing out of suspension while being pumped from said colloidal mill is reduced by reducing stress, pressure, and shear associated with at least a diaphragm pump.

11. The method of claim 1 wherein about 50 percent of said hydrogen chloride acid is added to said first emulsifier, said adding said first portion of said second emulsifier includes adding about 75 percent of said second emulsifier to said first solution, said adding said remaining portion of said acid solution includes adding about 50 percent of said hydrogen chloride acid to said second solution before adding about the remaining 25 percent of said second emulsifier to said third solution to form said soap solution.

12. The method of claim 11 wherein said adding said second emulsifier includes adding up to about 4% of said soap solution.

13. A method for creating asphalt pavement, comprising:
heating a base asphalt;
injecting said base asphalt into a colloid mill;
breaking up said base asphalt into small particles;
preparing a soap solution, wherein said soap solution includes an acid solution, water, and a first emulsifier, wherein said first emulsifier is an alkyl amities salt emulsifier;
combining said small particles of said base asphalt with said soap solution to create asphalt emulsion; and
mixing said asphalt emulsion with an aggregate to form said asphalt pavement;
wherein said preparing said soap solution includes
providing an alkyl amines salt first emulsifier;
providing a quaternary ammonium salt second emulsifier;
adding a first portion of said acid solution to said first emulsifier to form a first solution;
mixing a first portion of said quaternary ammonium salt second emulsifier to said first solution to form a second solution;
adding the remaining portion of said acid solution to said second solution to form a third solution;
combining the remaining portion of said quaternary ammonium salt second emulsifier to said third solution; and
adding water to said third solution to form said soap solution.

14. The method of claim 13 wherein said acid is hydrogen chloride.

15. The method of claim 13 wherein said acid is phosphoric acid.

16. The method of claim 13 wherein said base asphalt is a tire-rubber-modified asphalt, wherein said tire-rubber-modified asphalt includes at least particles of tire rubber and said base asphalt.

17. The method of claim 16 wherein the size of said particles of said tire rubber is less than or equal to about 425 microns.

* * * * *